United States Patent
Koning et al.

(10) Patent No.: US 9,811,385 B2
(45) Date of Patent: Nov. 7, 2017

(54) OPTIMIZING TASK MANAGEMENT

(75) Inventors: Maarten Koning, Bloomfield (CA); Stephen Li, Menlo Park, CA (US)

(73) Assignee: WIND RIVER SYSTEMS, INC., Alameda, CA (US)

( * ) Notice: Subject to any disclaimer, the term of this patent is extended or adjusted under 35 U.S.C. 154(b) by 1039 days.

(21) Appl. No.: 12/769,080

(22) Filed: Apr. 28, 2010

(65) Prior Publication Data
US 2011/0271076 A1    Nov. 3, 2011

(51) Int. Cl.
| | | |
|---|---|---|
| G06F 9/50 | (2006.01) | |
| G06F 1/00 | (2006.01) | |
| G06F 9/46 | (2006.01) | |
| G06F 9/30 | (2006.01) | |
| G06F 9/48 | (2006.01) | |
| G06F 1/32 | (2006.01) | |

(52) U.S. Cl.
CPC ........ *G06F 9/5061* (2013.01); *G06F 9/30189* (2013.01); *G06F 9/505* (2013.01); *G06F 9/5094* (2013.01); *G06F 1/3287* (2013.01); *G06F 9/4881* (2013.01); *Y02B 60/144* (2013.01)

(58) Field of Classification Search
CPC .... G06F 9/3885; G06F 9/5061; G06F 9/5094; G06F 9/505; G06F 9/4881; G06F 9/30189; G06F 1/3287; Y02B 60/144
USPC ............ 712/20, 229; 713/323; 718/105, 106
See application file for complete search history.

(56) References Cited

U.S. PATENT DOCUMENTS

| | | | | |
|---|---|---|---|---|
| 7,596,705 | B2* | 9/2009 | Kim ............................ | 713/300 |
| 8,566,836 | B2* | 10/2013 | Ramaraju et al. ........... | 718/104 |
| 2003/0236816 | A1* | 12/2003 | Venkatasubramanian .... | 709/107 |
| 2004/0098364 | A1* | 5/2004 | Liukkonen et al. .............. | 707/1 |
| 2007/0288931 | A1* | 12/2007 | Avkarogullari ............... | 719/312 |
| 2008/0104600 | A1* | 5/2008 | May ............................. | 718/103 |
| 2008/0163239 | A1* | 7/2008 | Sugumar et al. ............ | 718/105 |
| 2008/0256339 | A1* | 10/2008 | Xu et al. ...................... | 712/216 |
| 2008/0288748 | A1* | 11/2008 | Sutardja et al. ............... | 712/20 |
| 2009/0202240 | A1* | 8/2009 | Carroll et al. .................. | 398/45 |
| 2010/0037038 | A1* | 2/2010 | Bieswanger .......... | G06F 1/3203 712/220 |

OTHER PUBLICATIONS

Gondo, Masaki. "Blending asymmetric and symmetric multiprocessing with a single OS on ARM11 MPCore." Information Quarterly 5.4 (2006): 38-43.*
ARM11 MPCore Processor Technical Reference Manual, revision r2p0, Oct. 2008, pp. 1.2-1.3, 7.3.*

* cited by examiner

*Primary Examiner* — Daniel Pan
(74) *Attorney, Agent, or Firm* — Fay Kaplun & Marcin, LLP

(57) ABSTRACT

An electronic device includes a processing component and a task manager. The processing component is configurable for one of a single-core processing mode and a multi-core processing mode. The task manager determines a number of tasks running on the electronic device. The processor is configured to switch between either the single-core processing mode or the multi-core processing mode as a function of the number of tasks.

16 Claims, 4 Drawing Sheets

OPTIMIZING TASK MANAGEMENT

BACKGROUND

An operating system for an electronic device may be configured to process multiple tasks concurrently. Specifically, the electronic device may be configured with symmetric multiprocessing (SMP) system that enables the multiple tasks to be executed. The SMP may have a multiprocessor architecture in which two or more processors connect to a single shared memory. The SMP system may enable any of the processors to work on a task regardless of a location of the data in the memory.

The operating system for an electronic device may also be configured using a uniprocessor (uP) system. Because only a single processor is involved in the execution of tasks, the entire processing power of the processor may be devoted to the task. However, the uniprocessor system is unable to allow multiple tasks to be executed concurrently.

SUMMARY OF THE INVENTION

The exemplary embodiments of the present invention describe an electronic device comprising a processing component and a task manager. The processing component is configurable for one of a single-core processing mode and a multi-core processing mode. The task manager determines a number of tasks running on the electronic device. The processor is configured to switch between either the single-core processing mode or the multi-core processing mode as a function of the number of tasks.

DETAILED DESCRIPTION

Figure 1:
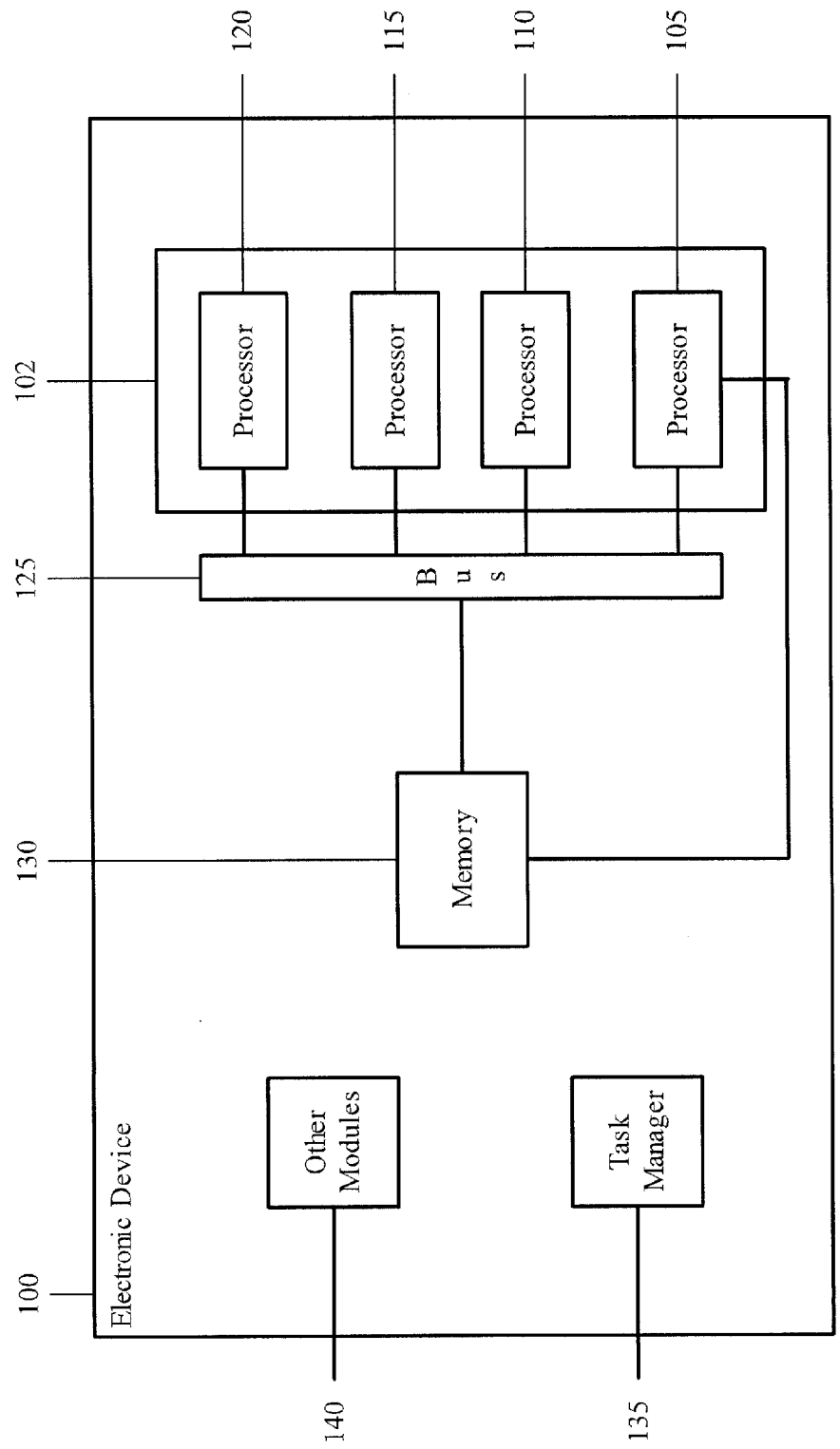
FIG. 1 shows a first electronic device according to an exemplary embodiment of the present invention.

The exemplary embodiments may be further understood with reference to the following description and the appended drawings, wherein like elements are referred to with the same reference numerals. The exemplary embodiments of the present invention describe an optimization of an operating system for task management. Specifically, the optimization entails utilizing a single-processor mode when a single task is being run while utilizing a multi-processor mode when multiple tasks are being run. The optimization, the single-processor mode, the multi-processor mode, and a related method will be discussed in further detail below.

FIG. 1 shows a first electronic device 100 according to an exemplary embodiment of the present invention. The electronic device 100 may include a quad-core processor 102 comprising a plurality of processors 105-120, a bus 125, a memory 130, a task manager 135, and other modules 140. The electronic device 100 may be any device that is capable of processing data to perform tasks. For example, the electronic device 100 may be a desktop terminal, a mobile computer such as a laptop, a mobile device such as a personal digital assistant, etc. Thus, the electronic device 100 may include the other modules 140 that perform respective functionalities of the electronic device 100.

The electronic device 100 may employ a multi-core processor such as one used in symmetric multiprocessing (SMP). According to the exemplary embodiments of the present invention, the multi-core processor may be represented with the quad-core processor 102 that comprises the plurality of processors 105-120. Specifically, the plurality of processors 105-120 may be a system of independent cores. That is, the plurality of processors 105-115 may be substantially similar to an integrated circuit in which the four processors 105-120 have been attached.

To facilitate the multiprocessing capable by the quad-core processor 102, the electronic device 100 may include the bus 125. The bus 125 may be a conventional subsystem used to transfer data between computer components such as from the processors 105-120 with the memory 130. The memory 130 may store data related to the electronic device 100. Those skilled in the art will understand that with multiprocessing, the processors 105-120 may access the memory 130 to perform the multiple tasks assigned to the processors 105-120 via the bus 125.

The quad-core processor 102 may implement multiprocessing in a single physical package. The processors 105-120 may be coupled together tightly or loosely. For example, the processors 105-120 may or may not share caches. Furthermore, the processors 105-120 may implement message passing or shared memory inter-core communication methods. The interconnection between the processors 105-120 may include a variety of topologies such as a bus, a ring, a 2-dimensional mesh, and a crossbar. The processors 105-120 may be identical in homogeneous multi-core systems while the processors 105-120 may not be identical in heterogeneous multi-core systems. Similar to single-processor systems, the processors 105-120 of the quad-core processor 102 may implement architectures such as superscalar, Very Long Instruction Word (VLIW), vector processing, Single Instruction Multiple Data (SIMD), and/or multithreading.

It should be noted that the use of the quad-core processor 102 with the processors 105-120 is only exemplary. According to another exemplary embodiment of the present invention, the multi-core processor may be a dual-core processor with two cores or processors. The exemplary embodiments of the present invention may apply to any processor that may include more cores than is described herein.

The proximity of the processors 105-120 in a common die allows a cache coherency circuit to operate at a much higher clock rate than is possible if the signals have to travel off-chip. Combining equivalent processors on a single die also significantly improves the performance of cache snoop operations. Thus, signals between different processors travel shorter distances and, therefore, degrade less. These higher quality signals allow more data to be sent in a given time period since individual signals may be shorter and do not need to be repeated as often.

The quad-core processor 102 may also improve response time while running intensive processes (e.g., antivirus scans, ripping/burning media, file conversion, searching for folders, etc.). For example, if an automatic virus scan initiates while a media program is being run, the application running the media program is far less likely to be starved of processor power, as the antivirus program will be assigned to a different processor core than the one running the media playback.

Assuming that the die can fit into the package physically, the design of the quad-core processor 102 may use much less Printed Circuit Board (PCB) space than multi-chip SMP designs. Also, a dual-core processor uses slightly less power than two coupled single-core processors, principally because of the decreased power required to drive signals external to the chip. Furthermore, the cores share some circuitry (e.g., L2 cache, interface to the front side bus (FSB), etc.). Accordingly, the quad-core processor 102 may make use of proven computing core library designs and produce a product with lower risk of design error than devising a new wider core design.

However, the capability and architecture of the quad-core processor 102 to execute multiple tasks concurrently may hinder optimal performance of a single task that a single-core processor would be more appropriate to handle. For example, in addition to operating system (OS) support, adjustments to existing software are required to maximize utilization of the computing resources provided by the quad-core processor 102. Also, the ability of the quad-core processor 102 to increase application performance depends on the use of multiple threads within applications.

From an architectural point of view, single-core processor designs may make better use of a silicon surface area than multi-core processors. Raw processing power is not the only constraint on system performance. Two processing cores sharing the same system bus and memory bandwidth limits a potential performance advantage. For example, if a single core is close to being memory bandwidth limited, using a dual-core may only give a partial improvement. It would be possible for an application that used two CPUs to end up running faster on one dual-core if communication between the CPUs was the limiting factor, which would count as a marked improvement.

Therefore, according to the exemplary embodiments of the present invention, a single-core processor mode is also utilized to handle task management when a single task is to be executed. Although the quad-core processor 102 enables multiple tasks to be run concurrently, the single-core processor mode enables a single task to be executed at an optimal efficiency without suffering the drawbacks related to using the architecture/methodology of the multi-core processor.

According to the exemplary embodiments of the present invention, the quad-core processor 102 may be configured to switch from a multi-core processor mode to a single-core processor mode. Specifically, when the electronic device 100 is running a single task, the quad-core processor 102 may be configured to function in a substantially similar manner as a single-core processor. As illustrated, the processor 105 may further be connected to the memory 130. Accordingly, when the single-core processor mode is initiated, the processor 105 may function as the "single-core" during this time.

The task manager 135 may determine the number of tasks that the electronic device 100 is currently running. It should be noted that the task manager 135 may determine the number of tasks by considering the user-operated programs being executed. That is, background tasks that the electronic device 100 is always running may be omitted from the determination. When the task manager 135 determines that the number of tasks is one, the quad-core processor 102 may reconfigure itself to the single-core processor mode. When the task manager 135 determines that the number of tasks is more than one and the single-core processor mode is active, the quad-core processor 102 may be reconfigured to function in the multi-core processor mode.

It should be noted that the processor 105 being connected to the memory 130 directly is only exemplary. In another exemplary embodiment, each of the processors 105-120 may include a direct connection to the memory 130 so that each of the processors 105-120 may be utilized in the single-core processor mode. In yet another exemplary embodiment, none of the processors 105-120 may have a direct connection to the memory 130 and only be indirectly connected via the bus 125.

It should be also noted that the use of a single memory 130 is only exemplary. According to further exemplary embodiments of the present invention, at least one further memory may be utilized with the electronic device 100. Thus, the processors 105-120 may access the memory 130 and/or the further memory. Accordingly, the electronic device 100 may also include a further bus that enables the processors 105-120 to access the further memory. The further bus and further memory may also enable non-uniform memory access (NUMA). Thus, the location of the memory (even multiple memories located within the electronic device itself) may dictate an access time by the processors. It should further be noted that the above may also apply to the further exemplary embodiments described herein.

Figure 2:
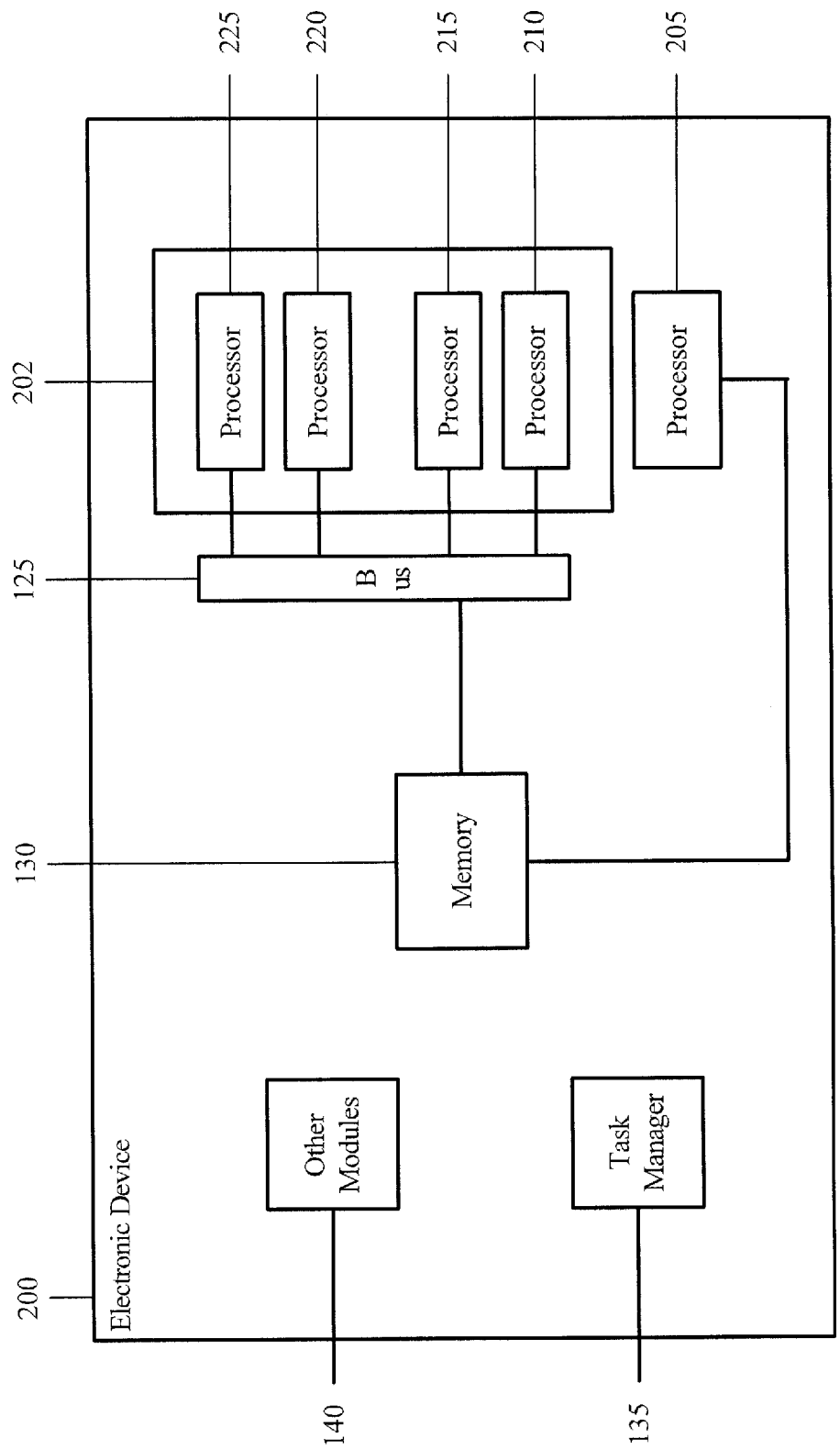
FIG. 2 shows a second electronic device according to an exemplary embodiment of the present invention.

FIG. 2 shows a second electronic device 200 according to an exemplary embodiment of the present invention. The electronic device 200 may be substantially similar to the electronic device 100 of FIG. 1. For example, the electronic device 200 may include the bus 125, the memory 130, the task manager 135, and the other modules 140. These components may function in a substantially similar manner as described above with reference to the electronic device 100. However, in the electronic device 200, a quad-core processor 202 comprising a plurality of processor 210-225 may be disposed with a single core processor 205.

The electronic device 200 may also be configured to switch between different modes. Because the electronic device 200 includes the processor 202 and the processor 205, the multi-core processor mode described above with reference to FIG. 1 will be referred to as multi-CPU mode while the single-core processor mode will be referred to as single-CPU mode with reference to FIG. 2. Specifically, the multi-CPU mode may entail utilizing the quad-core processor 202 while the single-CPU mode entails utilizing the single-core processor 205. According to the exemplary embodiment, when the task manager 135 determines that multiple tasks are being performed, the quad-core processor 202 may be initiated. When the task manager 135 determines that a single task is being performed, the single-core processor 205 may be initiated.

Figure 3:
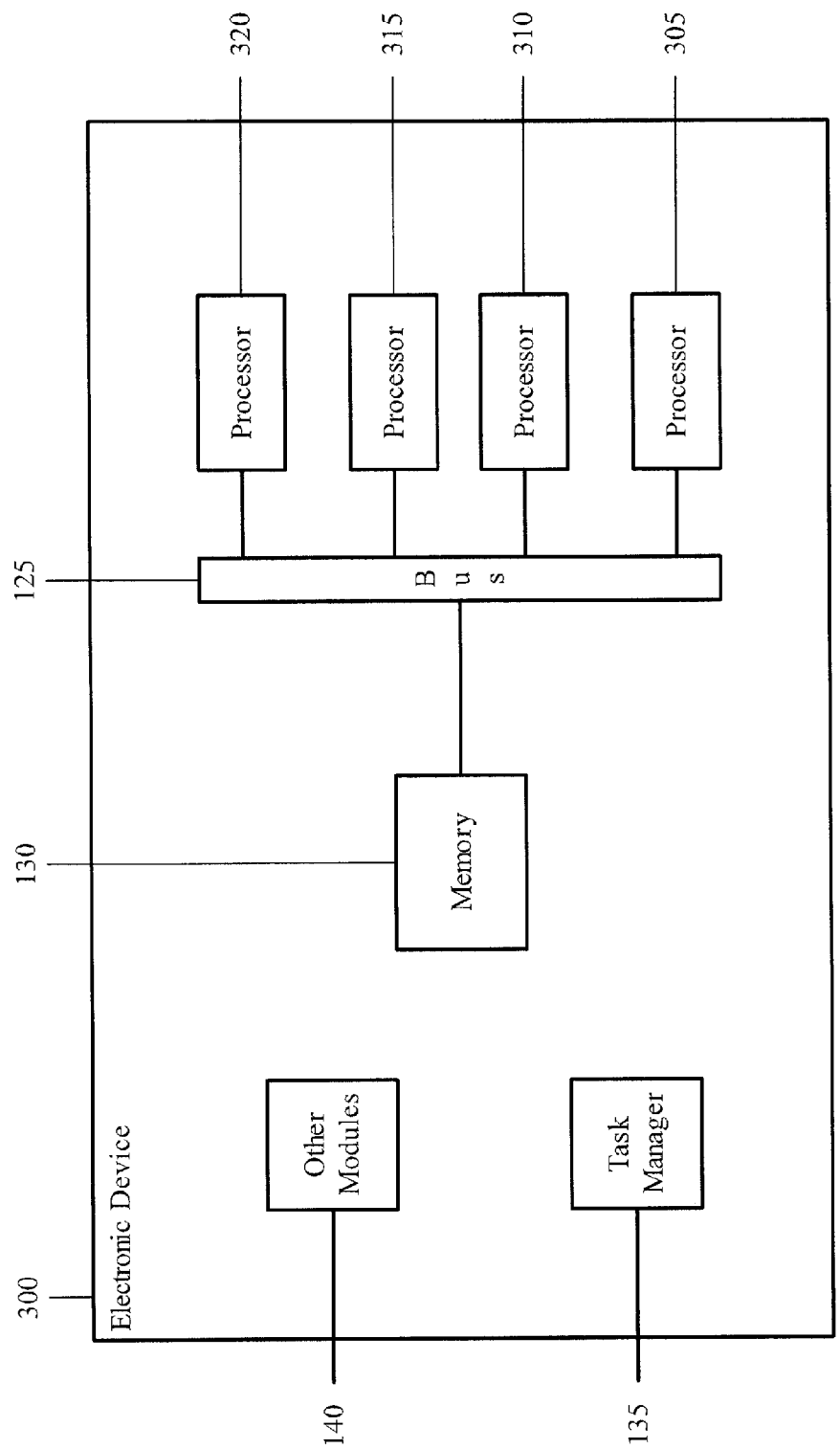
FIG. 3 shows a third electronic device according to an exemplary embodiment of the present invention.

FIG. 3 shows a third electronic device 300 according to an exemplary embodiment of the present invention. The electronic device 300 may be substantially similar to the electronic device 100 of FIG. 1. For example, the electronic device 300 may include the bus 125, the memory 130, the task manager 135, and the other modules 140. These components may function in a substantially similar manner as described above with reference to the electronic device 100. However, in the electronic device 300, a plurality of single-core processors 305-320 may be connected to the bus 125 which is connected to the memory 130.

The electronic device 300 may also be configured to switch modes. Similar to the second electronic device 200 of FIG. 2, because the electronic device 300 includes the processors 305-320, the multi-core processor mode described above with reference to FIG. 1 will be referred to as multi-CPU mode while the single-core processor mode will be referred to as single-CPU mode with reference to FIG. 3. Specifically, the multi-CPU mode may entail utilizing the at least two of the single-core processors 305-320 while the single-CPU mode entails utilizing the only one of the single-core processors 305-320. According to the exemplary embodiment, when the task manager 135 determines that multiple tasks are being performed, at least two of the single-core processors 305-320 may be assigned to handle the multiple tasks. When the task manager 135 determines that a single task is being performed, one of the single-core processors 305-320 may be assigned to handle the single task.

Figure 4:
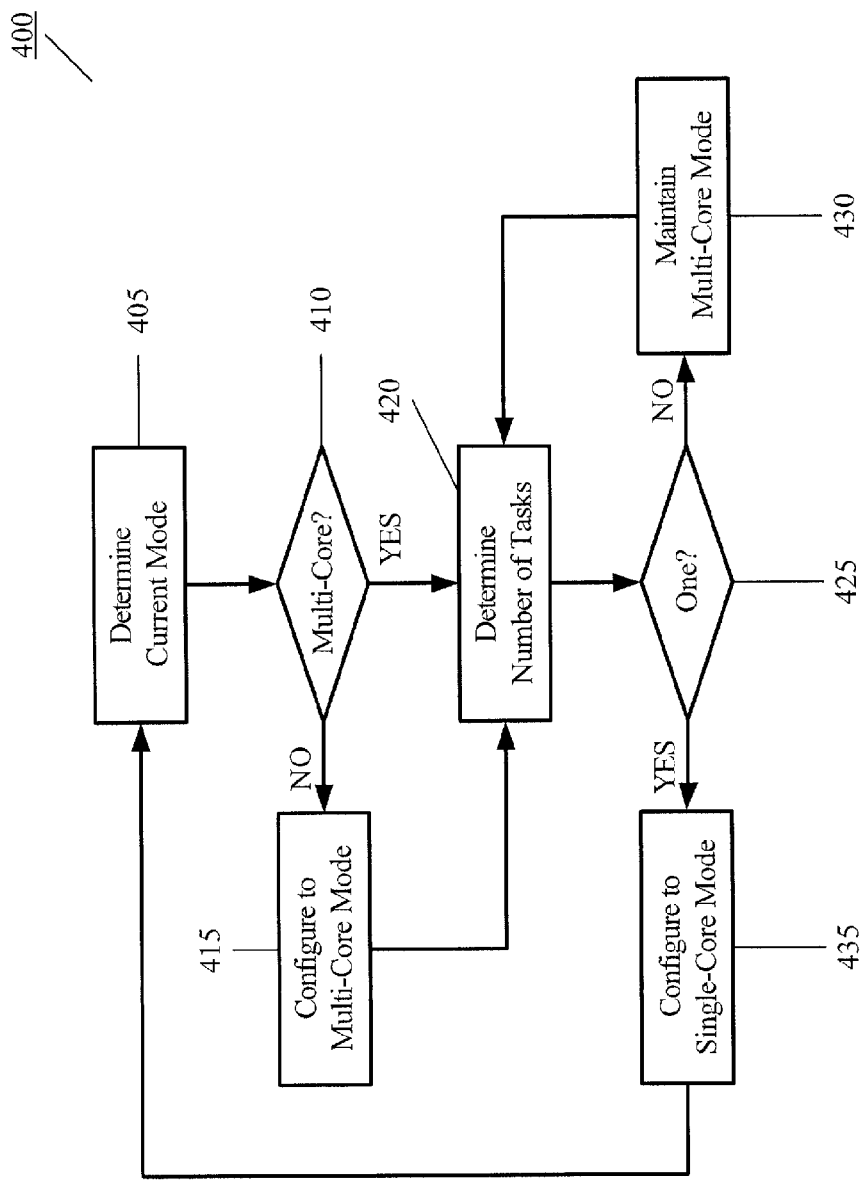
FIG. 4 shows a method for optimizing task management for an electronic device according to an exemplary embodiment of the present invention.

FIG. 4 shows a method 400 for optimizing task management for an electronic device according to an exemplary embodiment of the present invention. The method 400 will be described in which the multi-core processor mode is a default setting for the electronic device 100. That is, the electronic device 100 is configured for multi-processing and switches upon determining that only a single task is to be performed. Again, the tasks may be determined to be user-operated programs. The method 400 will be described with reference to the electronic device 100 of FIG. 1. However, it should be noted that a substantially similar method may also be used in conjunction with the electronic devices 200 and 300 of FIGS. 2 and 3, respectively.

In step 405, the task manager 135 determines a current mode of the electronic device 100. As discussed above, the method 400 relates to the electronic device 100 having a default setting as the multi-core processor mode. Thus, in step 410, a determination is made whether the current mode is the multi-core processor mode. If the current mode is the single-core processor mode, the method 400 continues to step 415. In step 415, the quad-core processor 102 is configured to the multi-processor mode.

In step 420, the task manager 135 determines the number of user-operated tasks running on the electronic device 100. Thus, in step 425, if the determination indicates that multiple tasks are being run concurrently, the method 400 continues to step 430 where the quad-core processor 102 remains operating in the multi-core processor mode. If step 425 determines that only a single task is being run, the method 400 continues to step 435 where the quad-core processor 102 configures to the single-core processor mode.

After step 430, the method 400 may return to step 420 to make a further determination of the number of user-operated tasks are being run. In this way, the method 400 may continually track the tasks being executed on the electronic device 100. Thus, when a change is detected by the task manager 135, an appropriate action may be taken to most efficiently adapt to the number of tasks being performed.

After step 435, the method 400 may return to step 405 where the current mode is determined. Since the quad-core processor 102 has been configured in the single-core processor mode, the method 400 may continue to steps 410 and 415 to reconfigure the quad-core processor 102 to the multi-core processor mode.

It should be noted that the default setting of the electronic device 100 being the multi-core processor mode is only exemplary. According to another exemplary embodiment, the electronic device 100 may not have a default setting. In such an embodiment, the method 400 may be altered accordingly. For example, the method 400 may determine the number of tasks and the current mode concurrently. Thus, if multiple tasks are being run and the current mode is the multi-core processor mode or a single task is being run and the current mode is the single-core processor mode, the task manager 135 may indicate that the current mode is to be maintained. However, if multiple tasks are being run and the current mode is the single-core processor mode or a single task is being run and the current mode is the multi-core processor mode, the task manager 135 may indicate that the current mode is to be reconfigured to the other mode.

The exemplary embodiments of the present invention may further include other features that apply to the electronic devices described herein where the processor is capable of switching modes. For example, a power management feature may be included. The power management feature may control a power consumption used by the processor as a function of the mode in which it is operating. When the processor is in a single-core processor mode (or single-CPU mode), the power management feature may deactivate, sleep, hibernate, etc. the other cores that are not in use. When the processor is in a multi-core processor mode (or multi-CPU mode), the power management feature may again deactivate, sleep, hibernate, etc. the other cores that are not in use.

The exemplary embodiments of the present invention enable an electronic device that is configured to operate in a multi-core processor mode to adapt and reconfigure to a single-core processor mode as a function of the number of tasks being run on the electronic device. Specifically, when a single task is being run on the electronic device, the single-core processor mode may be initiated. When multiple tasks are being run on the electronic device, the multi-core processor mode may be initiated. Thus, the electronic device may take advantage of the benefits from the multi-core processor mode when running multiple tasks while also taking advantage of the benefits from the single-core processor mode when running a single task.

In the single-core processor mode, the operating system of the electronic device may use single-core mutex mechanisms. Those skilled in the art will understand that the single-core mutex mechanisms may be relatively fast. In the multi-core processor mode, the operating system of the electronic device may use multiprocessor mutex mechanisms that are relatively slower but enable concurrency of the multiple tasks to be performed.

Those skilled in the art will understand that the exemplary embodiments described above may be implemented in any number of manners, including, as a separate software module, as a combination of hardware and software, etc. For example, the task manager 135 may be a program containing lines of code that, when compiled, may be executed to adapt the quad-core processor 102.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:
1. An electronic device, comprising:
a processing array including a plurality of processing cores, the processing component being configurable for one of a single-core processing mode and a multi-core processing mode,
wherein the single-core processing mode comprises the processing array configured to execute an operating system in a first operating system mode using a first one of the processing cores, wherein the first operating system mode is optimized to perform a single task, and
wherein the multi-core processing mode comprises the processing array configured to execute the operating system in a second operating system mode using the first one of the processing cores and a second one of the processing cores, wherein the second operating system mode is optimized to perform multiple tasks; and a task manager determining a number of user-operated tasks running on the electronic device, wherein the processing array is configured to operate in the single-core processing mode or the multi-core processing mode based only on the number of user-operated tasks, wherein the processing array operates in the single-core processing mode when the number of user-operated tasks is one and operates in the multi-core processing mode when the number of user-operated tasks is greater than one, wherein the single-core processing mode enables only the single task to be executed and disables a multi-core processing architecture.

2. The electronic device of claim 1, further comprising: a memory for storing data of the electronic device.

3. The electronic device of claim 2, further comprising: a bus connecting the processing array to the memory to enable accessing of the memory.

4. The electronic device of claim 1, wherein the processing array is a multiple-core processor.

5. The electronic device of claim 4, wherein a single core of the multiple-core processor is used during the single-core processing mode.

6. The electronic device of claim 4, wherein the multiple-core processor is one of a dual-core processor and a quad-core processor.

7. The electronic device of claim 1, wherein the processing array is a plurality of single-core processors.

8. The electronic device of claim 7, wherein at least two of the plurality of single-core processors are used for the multi-core processing mode and one of the plurality of single-core processors is used for the single-core processing mode.

9. A method, comprising:
determining a number of user-operated tasks running on an electronic device, the electronic device comprising a processing array including a plurality of processing cores, the processing array being configurable for one of a single-core processing mode and a multi-core processing mode,
wherein the single-core processing mode comprises the processing component configured to execute an operating system in a first operating system mode using a first one of the processing cores, wherein the first operating system mode is optimized to perform a single task, and
wherein the multi-core processing mode comprises the processing array configured to execute the operating system in a second operating system mode using the first one of the processing cores and a second one of the processing cores, wherein the second operating system mode is optimized to perform multiple tasks; and
configuring the processing array to operate in the single-core processing mode or the multi-core processing mode based only on the number of user-operated tasks,
wherein the processing array operates in the single-core processing mode when the number of user-operated tasks is one and operates in the multi-core processing mode when the number of user-operated tasks is greater than one,
wherein the single-core processing mode enables only the single task to be executed and disables a multi-core processing architecture.

10. The method of claim 9, wherein the electronic device further comprises a memory for storing data of the electronic device.

11. The method of claim 10, wherein the electronic device further comprises a bus connecting the processing array to the memory to enable accessing of the memory.

12. The method of claim 9, wherein the processing array is a multi-core processor.

13. The method of claim 12, wherein a single core of the multi-core processor is used during the single-core processing mode.

14. The method of claim 9, wherein the processing array is a plurality of single-core processors.

15. The method of claim 14, wherein at least two of the plurality of single-core processors are used for the multi-core processing mode and one of the plurality of single-core processors is used for the single-core processing mode.

16. A non-transitory computer readable storage medium with an executable program stored thereon, wherein the program instructs a processor to perform operations, comprising:
determining a number of user-operated tasks running on an electronic device, the electronic device comprising a processing array including a plurality of processing cores, the processing array being configurable for one of a single-core processing mode and a multi-core processing mode, wherein the single-core processing mode comprises the processing array configured to execute an operating system in a first operating system mode using a first one of the processing cores, wherein the first operating system mode is optimized to perform a single task, and wherein the multi-core processing mode comprises the processing array configured to execute the operating system in a second operating system mode using the first one of the processing cores and a second one of the processing cores, wherein the second operating system mode is optimized to perform multiple tasks; and
configuring the processing array to operate in the single-core processing mode or the multi-core processing mode based only on the number of user-operated tasks,
wherein the processing array operates in the single-core processing mode when the number of user-operated tasks is one and operates in the multi-core processing mode when the number of user-operated tasks is greater than one,
wherein the single-core processing mode enables only the single task to be executed and disables a multi-core processing architecture.

* * * * *